United States Patent
Moratz

(10) Patent No.: US 9,429,196 B1
(45) Date of Patent: Aug. 30, 2016

(54) BEARING SEAL WITH ACTIVE AIR PURGE

(71) Applicant: Schaeffler Technologies AG & Co. KG, Herzogenaurach (DE)

(72) Inventor: William Moratz, Gardiner, NY (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 14/731,488

(22) Filed: Jun. 5, 2015

(51) Int. Cl.
*F16C 33/76* (2006.01)
*F16C 33/72* (2006.01)
*F16C 33/78* (2006.01)

(52) U.S. Cl.
CPC ......... *F16C 33/726* (2013.01); *F16C 33/7853* (2013.01)

(58) Field of Classification Search
CPC F16C 33/726; F16C 33/7853; F16C 33/783; F16C 33/784
See application file for complete search history.

(56) References Cited

U.S. PATENT DOCUMENTS

| | | | | |
|---|---|---|---|---|
| 2,720,404 A | * | 10/1955 | Saywell | F16C 33/7853 277/370 |
| 2,827,344 A | * | 3/1958 | Maag | B61F 15/22 384/484 |
| 4,533,265 A | * | 8/1985 | Woodbridge | F16C 33/7896 277/369 |
| 4,697,936 A | * | 10/1987 | Bermond | F16J 15/3276 277/402 |
| 8,628,249 B2 | * | 1/2014 | Winkelmann | F16C 19/163 277/552 |

* cited by examiner

*Primary Examiner* — Thomas R. Hannon
(74) *Attorney, Agent, or Firm* — Volpe and Koenig, P.C.

(57) ABSTRACT

A rolling bearing assembly having a first ring with a first circumferentially extending seal groove, and a fluid path in the first ring with an inlet located on an outer surface and an outlet connected to the first seal groove. A second ring has a second circumferentially extending seal groove. Rolling elements are supported between the first ring and the second ring, with the rolling elements running on races thereof. A seal including a first radial end that is engaged within the first seal groove is provided. A second radial end is located in the second seal groove, and the second end includes a circumferentially extending race side contact and a circumferentially extending outside lip. At least one passage that is in communication with the at least one fluid path extends from the first to the second radial end and discharges between the race side contact and the outside lip.

19 Claims, 2 Drawing Sheets

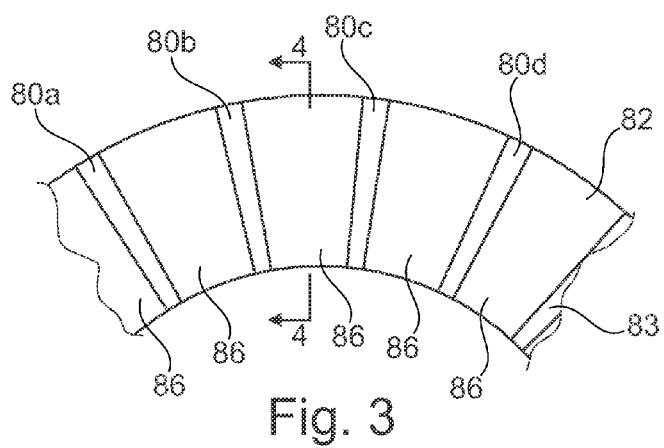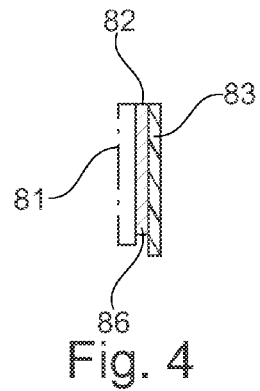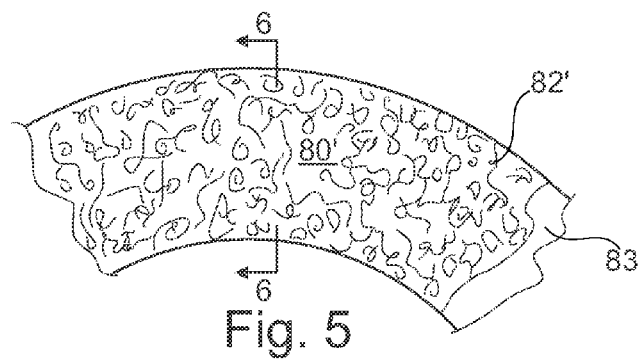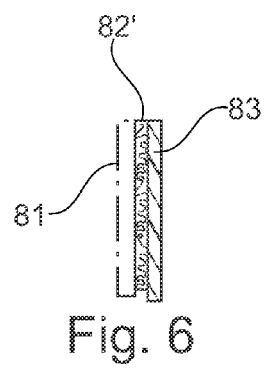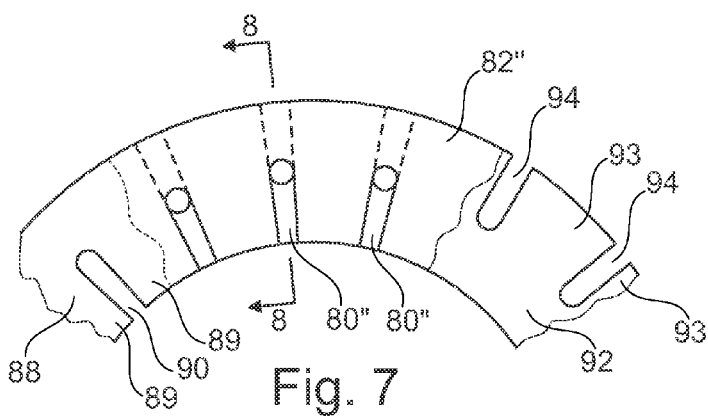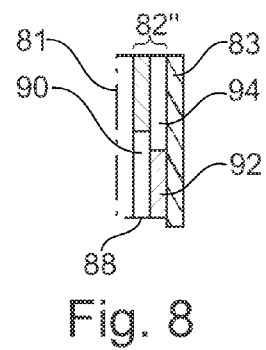

BEARING SEAL WITH ACTIVE AIR PURGE

FIELD OF INVENTION

The present invention relates to a rolling bearing assembly, and is more particularly related to a seal for a rolling bearing assembly.

BACKGROUND

Bearing assemblies are used in a wide range of applications. Some applications require a seal arranged between a radially inner ring and a radially outer ring of the bearing to prevent contaminants from entering the area of the rolling elements. The radially outer end of the seal is typically fixed to the radially outer ring and the radially inner end of the seal typically contacts the radially inner ring. However, the positions can be reversed. Seals exhibit varying sealing characteristics depending on the rotational speed of the shaft or rotor on which the bearing assembly is supported. The sealing characteristics also vary depending on the force with which the radially inner end of the seal is pressed against the radially inner ring.

It has also been known to provide a positive pressure in the area of the rolling elements, such as through an air or air/oil feed into the sealed area. However, this can result in a deterioration of the lubricant film developed between the rolling elements and the races on the bearing rings.

It would be desirable to provide a rolling bearing assembly including a configuration that allows a positive pressure to be developed to further prevent the entry of contaminants into the area of the rolling elements without the drawbacks of the known prior art.

SUMMARY

A rolling bearing assembly is provided having a first ring with a first race and including a first circumferentially extending seal groove. At least one fluid path is located in the first ring with an inlet located on an outer surface and an outlet connected to the first seal groove. A second ring includes a second race, facing the first race, and has a second circumferentially extending seal groove. Rolling elements are supported between the first ring and the second ring, with the rolling elements running on the first race and the second race. A seal including a first radial end that is engaged within the first circumferentially extending seal groove is provided. A second radial end is located in the second circumferentially extending seal groove, and the second radial end includes a circumferentially extending race side contact and a circumferentially extending outside lip. At least one passage that is in communication with the at least one fluid path extends from the first radial end to the second radial end that discharges between the race side contact and the outside lip.

This arrangement allows for a positive pressure air or air/oil purge seal, without having the air pass through the rolling elements.

In another aspect, the rolling bearing assembly has a first circumferentially extending lock ring groove adjacent to the first seal groove, and a lock ring located in the lock ring groove. This holds the seal in position.

In another aspect, the second seal groove defines a shoulder with an axial face, and the outside lip contacts the axial face.

Preferably, the seal comprises first, second, and third seal layers, with the second layer between the first and third layers, and the second seal layer includes the at least one passage. In one arrangement, the first and third seal layers are impermeable layers and the second seal layer includes spaced apart segments defining the at least one passage therebetween. In another arrangement, the first and third seal layers are impermeable layers and the second seal layer is formed of an air permeable material to define the at least one passage. In a further development of this arrangement, the air permeable material is an open cell structure.

In another aspect, the first and third seal layers are impermeable layers and the second seal layer includes a first plate having radially inwardly directed teeth with spaces therebetween and a second plate with radially outwardly directed teeth with spaces therebetween, and the spaces in the first plate and the second plate overlap in a medial area to define the at least one passage.

In one preferred arrangement, the first and third seal layers are formed of a reinforced paper material. Other materials could be used. Optionally, the third layer includes or comprises an aluminum disc.

In one embodiment, the first ring is an outer ring of the bearing assembly, and the second ring is the inner ring. The opposite arrangement is also possible.

In another embodiment, the bearing includes two of the seals. The first ring includes a third circumferentially extending seal groove on an opposite axial side from the first seal groove, and at least one second fluid path with a second inlet is located on the outer surface of the first ring and a second outlet is connected to the third seal groove. The second ring includes a fourth circumferentially extending seal groove on an opposite axial side from the second seal groove. A second seal including a first radial end engages within the third circumferentially extending seal groove, and a second radial end of the second seal is located in the fourth circumferentially extending seal groove. The second radial end of the second seal includes a circumferentially extending race side contact and a circumferentially extending outside lip. At least one second passage is in communication with the at least one second fluid path and extends from the first radial end to the second radial end of the second seal where it discharges between the race side contact and the outside lip of the second seal.

This provides a rolling bearing with air purge seals on both axial sides.

The rolling bearing assembly is preferably located in a housing where the required pressurized air or air/oil mix is delivered to the inlet or inlets on the outer surface of the first ring.

Additional embodiments are described below and in the claims.

BRIEF DESCRIPTION OF THE DRAWINGS

The foregoing Summary and the following detailed description will be better understood when read in conjunction with the appended drawings, which illustrates a preferred embodiment of the invention. In the drawings:

FIG. 3 is a partial plan view showing one embodiment of a second seal layer used in the rolling bearing assembly of FIG. 1.

FIG. 4 is a cross-sectional view taken along line 4-4 in FIG. 3.

FIG. 5 is a partial plan view showing a second embodiment of second seal layer for use in the seal of the rolling bearing assembly of FIG. 1.

FIG. 6 is a cross-sectional view taken along line 6-6 in FIG. 5.

FIG. 7 is a third embodiment of a second seal layer for use in the seal of the rolling bearing assembly of FIG. 1.

FIG. 8 is a cross-section view through the seal taken along line 8-8 in FIG. 7.

DETAILED DESCRIPTION OF THE PREFERRED EMBODIMENTS

Figure 1:
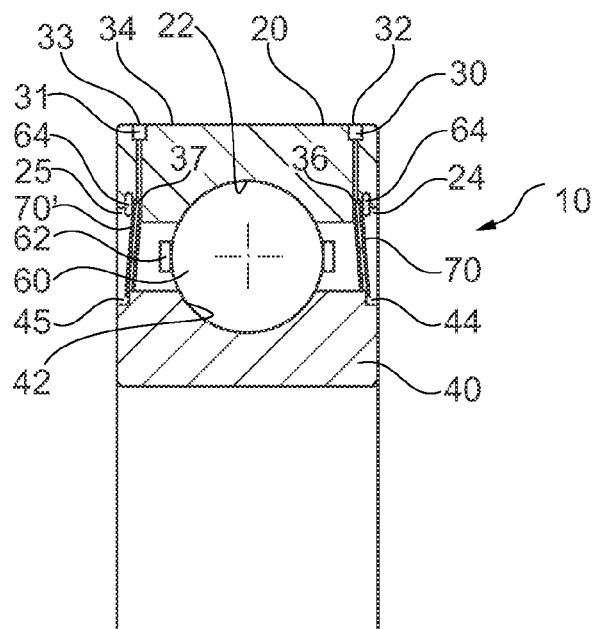
FIG. 1 is a cross-sectional view through a rolling bearing assembly according to a preferred embodiment.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 2:
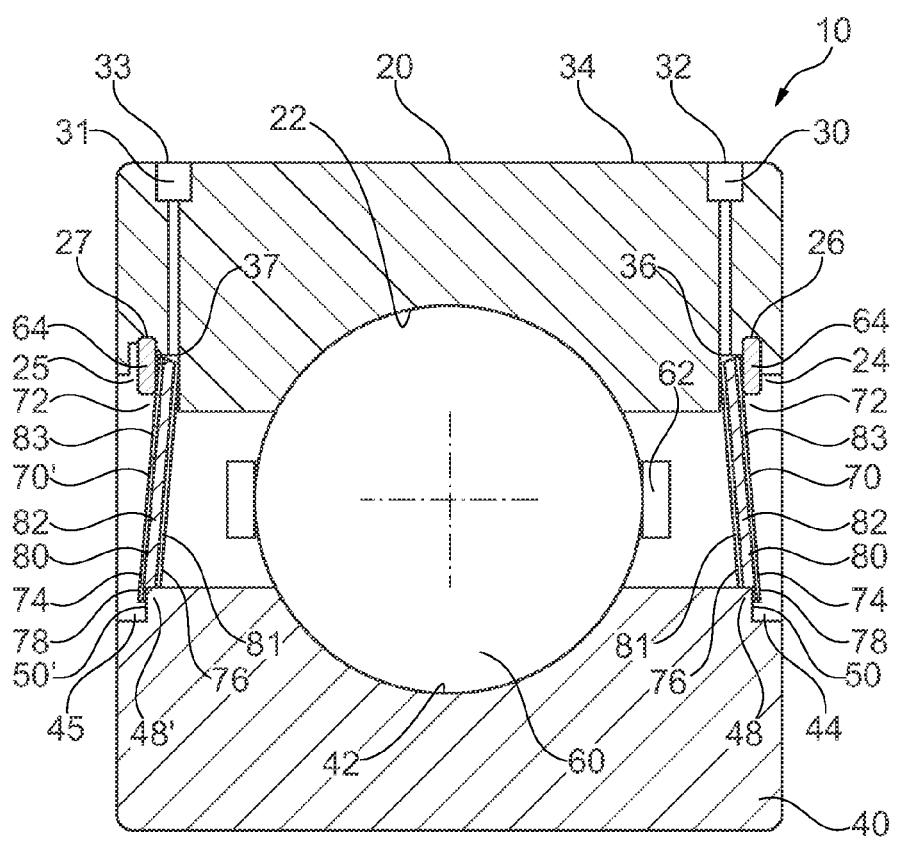
FIG. 2 is an enlarged cross-sectional view through the rolling bearing assembly of FIG. 1.

As shown in FIGS. 1 and 2, a rolling bearing assembly 10 in accordance with one preferred embodiment is shown. The rolling bearing assembly 10 includes a first ring 20 having a first race 22 and including a first circumferentially extending seal groove 24 located on a first axial side. At least one fluid path 30 is defined through the first ring 20 which includes an inlet 32 located on an outer surface of the first ring 20 and an outlet 36 connected to the first seal groove 24.

A second ring 40 is provided having a second race 42 facing the first race 22. The second ring 40 includes a second circumferentially extending groove 44. Rolling elements 60 are supported between the first ring 20 and the second ring 40. The rolling elements 60 run on the first race 22 and the second race 42. Preferably, the rolling elements 60 are retained via a cage 62. However, a cage can be omitted.

A seal 70 including a first radial end 72 is engaged within the first circumferentially extending seal groove 24. Preferably, a first circumferentially extending lock ring groove 26 is located adjacent to the first seal groove 24, and a lock ring 64 is located in the lock ring groove 26. The seal 70 includes a second radial end 74 located in the second circumferentially extending groove 44. The second radial end 74 includes a circumferentially extending race side contact 76 and a circumferentially extending outside lip 78. At least one passage 80 is in communication with the at least one fluid path 30 and extends from the first radial end 72 to the second radial end 74 where it discharges between the race side contacts 76 and the outside lip 78 in order to provide an active air purge seal without having the air routed through the bearing interior. Preferably, the race side contact 76 of the seal 70 has more resistance to the flow of air or an air/oil mixture from the at least one passage 80 than the outside lip 78 so that the air flow is directed outwardly between the outside lip 78 and the area where the outside lip 78 contacts the second ring 40. The outside lip 78 can be made of a more resilient material, a thinner material, or can extend further such that it provides less resistance to deflection due to the air flow than the race side contact 76 at the second radial end 74 of the seal 70.

As shown in detail in FIG. 2, preferably the second seal groove 44 defines a shoulder 48 with an axial face 50, and the outside lip 78 contacts this axial face 50 to prevent the ingress of debris from outside into the area of the rolling elements 60 and the races 22, 42.

Still with reference to FIG. 2, the seal 70 comprises first, second and third seal layers 81, 82, 83 respectively. The second seal layer 82 includes the at least one passage 80.

Preferably, the first seal layer 81 and the third seal layer 83 are impermeable layers and the second seal layer 82 includes spaced apart segments 86, as shown in FIGS. 3 and 4, which define the at least one passage therebetween with multiple passages being defined in FIG. 3 labeled as 80A, 80B, 80C, 80D. The layers 81, 82, 83 can be made of reinforced paper, polymeric, or metallic material, or any combination thereof. In FIG. 3 the inner layer 81 has been removed for visibility, and in FIG. 4 the inner layer 81 is shown in phantom lines.

Alternatively, as shown in FIGS. 5 and 6, the first and third seal layers 81, 83 are also impermeable layers, and the second seal layer 82' is formed of an air permeable material to define the at least one passage 80'. Preferably, the air permeable material is an open cell structure and can be, for example, an open cell foam, a porous ceramic material, or any other suitable open cell elastomeric material. FIG. 5 illustrates a plan view of the second layer 82' placed on the third layer 83, with the first layer 81 having been removed for visibility. In FIG. 6, the first layer 81 is shown in phantom lines.

Referring now to FIGS. 7 and 8, a further alternative construction for the seal 70 is shown with the second layer 82". Here, the second layer 82" is located between the first layer 81 (shown in phantom lines in FIG. 8), and the third layer 83, also shown in FIG. 8. The second layer 82" includes a first plate 88 having radially inwardly directed teeth 89 with spaces 90 therebetween, and a second plate 92 with radially outwardly directed teeth 93 with spaces 94 therebetween located on the first plate 88. The spaces 90, 94 in the first plate and the second plate 88, 92 overlap in a medial area to define the at least one passage 80".

It is also possible to provide the second seal layer 82 as an embossed or stamped ring having channel shaped grooves defined therein that define the at least one passage. Those skilled in the art will recognize that other construction methods for the second ring 82 are possible.

In one preferred arrangement, the first and third seal layers 81, 83 are formed of a reinforced paper material. One preferred material is a 100% rag stock electrical grade insulating paper having dielectric properties, which avoids a static charge build-up due to rubbing contact of the seal with the second ring 40. The third layer 83 may be formed of an aluminum disc or may include an aluminum disc as a stiffener. Alternatively, a polymeric material or metallic material can be used for the first and/or third seal layers 81, 83. The race side contact 76 and the outside lip 78 are preferably formed of the same materials as the first and third seal layers 81, 83. However, they could be formed of a different material that are bonded, adhered or otherwise connected to the first and third seal layers.

As shown in FIG. 1, the first ring 20 is preferably an outer bearing ring of the bearing assembly 10, and the second bearing ring 40 is the inner ring. However, those skilled in the art will recognize that depending upon the particular application in which an outer part rotates about a fixed inner shaft, the first bearing ring 20 could be the inner ring and the second bearing ring 40 could be the outer ring.

Referring again to FIGS. 1 and 2, in one preferred arrangement, the first ring 20 also includes a third circumferentially extended seal groove 25 on an opposite axial side from the first seal groove 24 and at least one second fluid path 31 with a second inlet 33 is located on an outer surface 34 of the first ring 20. The second outlet 37 is connected to the third seal groove 25. Here, the second ring 40 preferably also includes a fourth circumferentially extending seal groove 45 on an opposite axial side from the second seal groove 44. A second seal 70' which is identical to the first seal 70 includes a first radial end 72 that engages within the third circumferentially extending seal groove 25, and a second radial end 74 of the second seal 70' is located in the fourth circumferentially extending seal groove 45. The second radial end 74 of the second seal 70' includes the circumferentially extending race side contact 76 and a circumferentially outside lip 78. At least one second passage 80 in communication with at least one second fluid path 31 extends from the first radial end 72 to the second radial end 74 of the second seal 70' so that it discharges between the race side contact 76 and the outside lip 78 of the second seal 70'. This arrangement provides for an active air purge seal that acts to keep solid and liquid contamination from within the rolling elements of the bearing using positive air pressure without any air flow through the rolling component area. This arrangement is useful in equipment in which both axial sides of the rolling bearing assembly 10 are exposed two contaminants in use. The second seal 70' is preferably held in position with a snap ring 64 located in a lock ring groove 27 that is adjacent to the third seal groove 25 in a similar manner to the first seal 70.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A rolling bearing assembly comprising:
   a first ring having a first race and including a first circumferentially extending seal groove, and at least one fluid path with an inlet located on an outer surface of the first ring and an outlet connected to the first seal groove;
   a second ring having a second race, facing the first race, and including a second circumferentially extending seal groove;
   rolling elements supported between the first ring and the second ring, the rolling elements running on the first race and the second race; and
   a seal including a first radial end engaged within the first circumferentially extending seal groove, and a second radial end located in the second circumferentially extending seal groove, the second radial end including a circumferentially extending race side contact and a circumferentially extending outside lip, and at least one passage in communication with the at least one fluid path and extending from the first radial end to the second radial end that discharges between the race side contact and the outside lip.

2. The rolling bearing assembly of claim 1, further comprising a first circumferentially extending lock ring groove adjacent to the first seal groove, and a lock ring located in the lock ring groove.

3. The rolling bearing assembly of claim 1, wherein the second seal groove defines a shoulder with an axial face, and the outside lip contacts the axial face.

4. The rolling bearing assembly of claim 1, wherein the seal comprises first, second, and third seal layers, and the second seal layer includes the at least one passage.

5. The rolling bearing assembly of claim 4, wherein the first and third seal layers are impermeable layers and the second seal layer includes spaced apart segments defining the at least one passage therebetween.

6. The rolling bearing assembly of claim 4, wherein the first and third seal layers are impermeable layers and the second seal layer is formed of an air permeable material to define the at least one passage.

7. The rolling bearing assembly of claim 6, wherein the air permeable material is an open cell structure.

8. The rolling bearing assembly of claim 4, wherein the first and third seal layers are impermeable layers and the second seal layer includes a first plate having radially inwardly directed teeth with spaces therebetween and a second plate with radially outwardly directed teeth with spaces therebetween, and the spaces in the first plate and the second plate overlap in a medial area to define the at least one passage.

9. The rolling bearing assembly of claim 4, wherein the first and third seal layers are formed of a reinforced paper material.

10. The rolling bearing assembly of claim 4, wherein the third layer includes an aluminum disc.

11. The rolling bearing assembly of claim 1, wherein the first ring is an outer ring of the bearing assembly, and the second ring is the inner ring.

12. The rolling bearing assembly of claim 1, wherein the first ring includes a third circumferentially extending seal groove on an opposite axial side from the first seal groove, and at least one second fluid path with a second inlet located on an outer surface of the first ring and a second outlet connected to the third seal groove;
   the second ring includes a fourth circumferentially extending seal groove on an opposite axial side from the second seal groove; and
   a second seal including a first radial end engages within the third circumferentially extending seal groove, and a second radial end of the second seal is located in the fourth circumferentially extending seal groove, the second radial end of the second seal including a circumferentially extending race side contact and a circumferentially extending outside lip, and at least one second passage in communication with the at least one second fluid path and extending from the first radial end to the second radial end of the second seal that discharges between the race side contact and the outside lip of the second seal.

13. A rolling bearing assembly comprising:
   a first ring having a first race and including first and third circumferentially extending seal grooves on opposite axial sides, and at least one first and one second fluid path with inlets located on an outer surface of the first ring and a first outlet connected to the first seal groove and a second outlet connected to the third seal groove;
   a second ring having a second race, facing the first race, and including second and fourth circumferentially extending seal grooves on opposite axial sides;

rolling elements supported between the first ring and the second ring, the rolling elements running on the first race and the second race; and first and second seals, each including a first radial end and a second radial end, the first radial end of the first seal engaged within the first circumferentially extending seal groove and the first radial end of the second seal engaged in the third circumferentially extending seal groove, and the second radial end of the first seal located in the second circumferentially extending seal groove and the second radial end of the second seal located in the fourth circumferentially extending seal groove, the second radial ends each including a circumferentially extending race side contact and a circumferentially extending outside lip, and at least one first passage in communication with the at least one first fluid path and extending from the first radial end to the second radial end of the first seal that discharges between the race side contact and the outside lip of the first seal, and at least one second passage in communication with the at least one second fluid path and extending from the first radial end to the second radial end of the second seal that discharges between the race side contact and the outside lip of the second seal.

14. The rolling bearing assembly of claim 13, wherein the seals each comprise first, second, and third seal layers, and the second seal layer includes the respective at least one first or second passage.

15. The rolling bearing assembly of claim 14, wherein the first and third seal layers are impermeable layers and the second seal layer includes spaced apart segments defining the at least one passage therebetween.

16. The rolling bearing assembly of claim 14, wherein the first and third seal layers are impermeable layers and the second seal layer is formed of an air permeable material to define the at least one passage.

17. The rolling bearing assembly of claim 16, wherein the air permeable material is an open cell structure.

18. The rolling bearing assembly of claim 14, wherein the first and third seal layers are impermeable layers and the second seal layer includes a first plate having radially inwardly directed teeth with spaces therebetween and a second plate with radially outwardly directed teeth with spaces therebetween, and the spaces in the first plate and the second plate overlap in a medial area to define the at least one passage.

19. The rolling bearing assembly of claim 14, wherein the first and third seal layers are formed of a fiber reinforced paper material.

* * * * *